United States Patent [19]
Bradford

[11] Patent Number: 5,665,230
[45] Date of Patent: Sep. 9, 1997

[54] FUEL FILTER

[75] Inventor: Peter Francis Bradford, Sudbury, England

[73] Assignee: Lucas Industries Public Limited Company, West Midlands, United Kingdom

[21] Appl. No.: 519,819

[22] Filed: Aug. 25, 1995

[30] Foreign Application Priority Data

Sep. 2, 1994 [GB] United Kingdom ............... 9417657

[51] Int. Cl.$^6$ .................................................. B01D 35/01
[52] U.S. Cl. .................... 210/305; 210/307; 210/436; 210/439; 210/440
[58] Field of Search .................................. 210/305, 307, 210/436, 439, 440, 455, 472

[56] References Cited

U.S. PATENT DOCUMENTS 5,382,361  1/1995  Brun ........................................ 210/436

FOREIGN PATENT DOCUMENTS

| 537520 | 4/1993 | European Pat. Off. ............... 210/440 |
| 0547951A1 | 6/1993 | European Pat. Off. ........ B01D 35/01 |
| 0575196A1 | 12/1993 | European Pat. Off. ........ B01D 35/01 |
| 0579484A1 | 1/1994 | European Pat. Off. ........ B01D 35/01 |
| A-2 548 920 | 1/1995 | France . |
| A-886 623 | 1/1962 | United Kingdom . |

*Primary Examiner*—Matthew O. Savage
*Attorney, Agent, or Firm*—Ostrolenk, Faber, Gerb & Soffen, L.L.P.

[57]  ABSTRACT

A fuel filter element includes an annular filter medium which is supported on a lower support plate. Fuel flows downwardly through the medium and then through apertures at the outer periphery of the support plate. The support plate is provided with depending annular baffles, the outer one being adjacent the apertures but inwardly thereof. The baffles and support plate form an air collection chamber from which air escapes at a controlled rate through an orifice into a central outlet tube.

8 Claims, 1 Drawing Sheet

U.S. Patent      Sep. 9, 1997      5,665,230
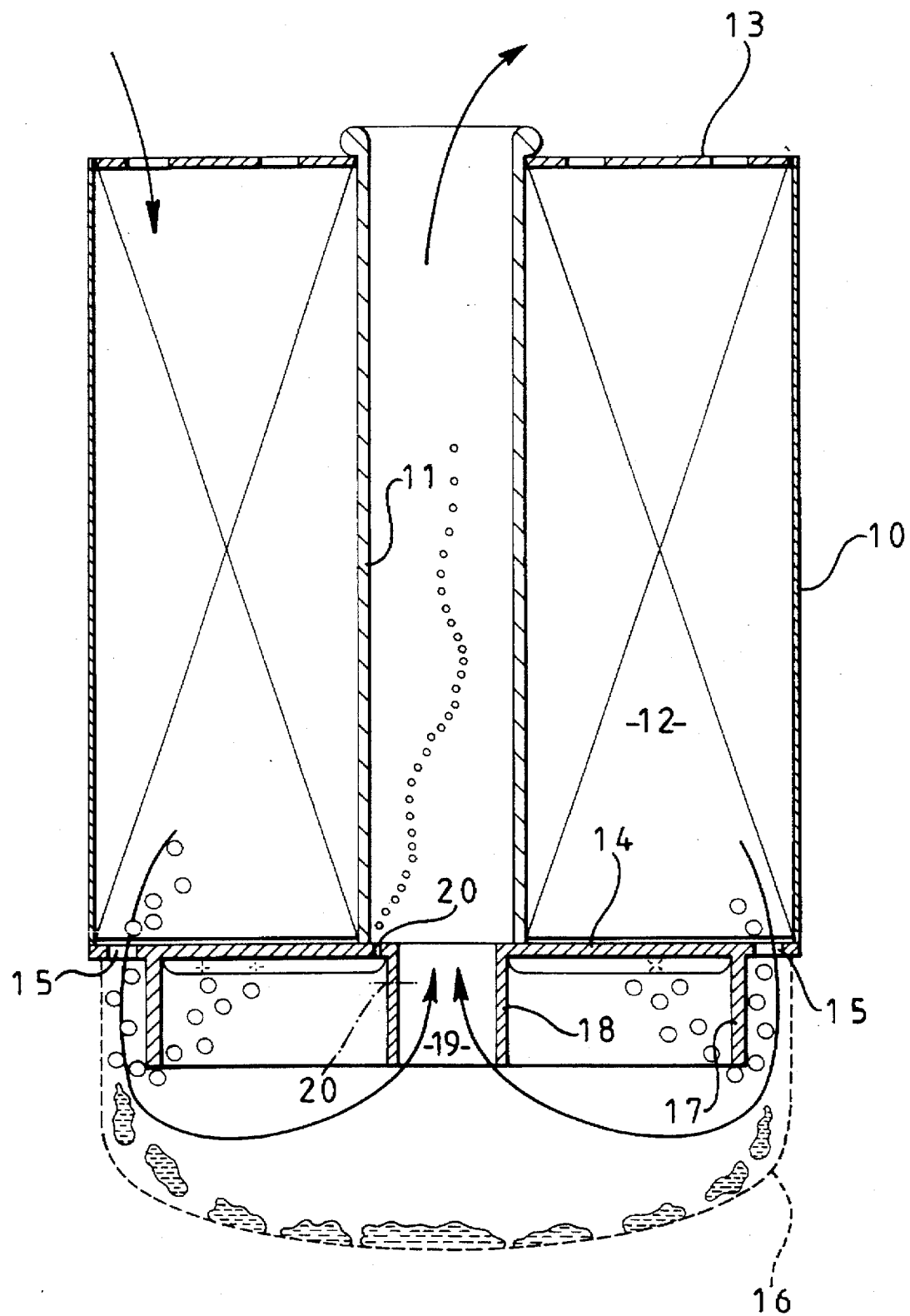

FUEL FILTER

This invention relates to fuel filter elements of the kind having an outer casing, an inner tube which extends within the casing, a filter medium which is located between the outer wall of the tube and the inner wall of the casing and upper and lower annular support plates which extend between the casing and the tube to support the filter medium, the plates being apertured to allow fuel flow through the filter medium.

Such filter elements are well known in the art and have two forms one being where in use, the element is clamped between upper and lower housing parts with the upper housing part defining a fuel inlet connection and a fuel outlet connection and the lower housing part defining a bowl which affords communication between the lower end of the tube and the apertures in the lower support plate. The two housing parts and the filter element are clamped by a central bolt which extends with clearance through the tube. The upper housing part defines an annular chamber open to the apertures in the upper support plate and communicating with the fuel inlet connection. In addition the upper housing part defines a central spigot which locates in sealing relationship in the upper portion of the tube, the spigot being hollow and communicating with the outlet connection. The other form of element is for use where the element is in screw thread engagement or is otherwise secured to a housing part similar to the aforesaid upper housing part. The role of the lower housing part is effected by a bowl portion which is an integral part of the casing of the element.

The filter element forms part of the fuel supply system of an engine and downstream of the filter element are components of the fuel system such as a high pressure fuel injection pump. The fuel as supplied for use contains solid contaminant, water in the form of small droplets and air. The solid contaminant is retained to a substantial extent by the filter medium and the water and air pass through the filter medium. Since the injection pump contains steel parts which are machined to a high degree of accuracy and have small working clearances, it is necessary to ensure that as much of the water as possible is removed from the fuel in order to minimise the risk of rust formation. So far as the air is concerned, the high pressure pump is designed to cope with small quantities of air supplied to the pump but large quantities of air may upset its operation.

The object of the invention is to provide a filter element of the kind specified in an improved form.

According to the invention in a filter element of the kind specified and in which the fuel flows downwardly through the filter medium in use, the apertures in the lower support plate are located adjacent the outer peripheral surface of the plate and depending from the lower support plate are first and second annular baffles the outer one of which is located adjacent to but inwardly of said apertures and the inner one of which defines an entrance to the lower end of the central tube, said baffles and the support plate defining an air collection chamber, and an orifice through which air collecting in said chamber can escape at a controlled rate to said inner tube.

An example of a filter element in accordance with the invention will now be described with reference to the accompanying drawing which shows the element in diagrammatic side elevation.

The element comprises an outer casing 10 of hollow cylindrical form within which is positioned a central tube 11. Intermediate the outer surface of the tube 11 and the inner surface of the casing 10 is an annular filter medium 12 which conveniently is formed by winding at least two strips of filter paper about the central tube, the longitudinal edges of the paper being coated with adhesive in such a manner so that as winding takes place, "V" shaped pockets are formed. At the upper end of the filter medium there is provided an upper support plate 13 which has a central opening to receive the upper end of the tube. The outer peripheral edge of the support plate is conveniently secured to the casing by a rolling operation. The upper support plate is also provided with a plurality of apertures through which fuel can flow into the open ends of the pockets of the filter medium.

In the use of the element it is secured to a support housing (not shown) which defines a fuel inlet chamber above the support plate and has a depending spigot which locates in sealing relationship within the upper end of the central tube 11. The spigot is hollow and is connected to a fuel outlet and the inlet chamber is connected to a fuel inlet.

At its lower end the filter medium 12 rests on a lower support plate 14 which is provided with angularly spaced and radially disposed supporting ribs on which the filter medium rests. Conveniently the support plate rests upon a step defined at the junction of the casing and a bowl portion 16 integrally formed with the casing.

Adjacent its outer periphery the lower support plate is provided with a plurality of apertures 15 and it is also provided with first and second annular baffles which extend downwardly from the main body of the support plate. The outer baffle 17 is located adjacent to but inwardly of the apertures 15 and the inner baffle 18 has a slightly smaller diameter than the tube 11 and it forms an entrance 19 to the lower end of the tube. The lower end of the tube forms a seal with the support plate.

In operation, when fuel is supplied to the inlet the fuel flows downwardly through the filter medium 12 and substantially all the solid contaminant is retained in the medium. Air and water contained in the fuel pass through the medium and flow into the space defined by the bowl portion, through the apertures 15. The fuel flows to the entrance 19 and during such flow the water by sedimentation action, falls to the bottom of the bowl portion 16 together with at least some of the fine particles of solid contaminant which have passed through the filter medium. The air which flows through the apertures 15 collects in the annular air collection chamber which is defined by the baffles 17, 18 and the support plate. This air is allowed to escape from the air collection chamber at a controlled rate through a restricted orifice 20 which conveniently is formed in the portion of the lower support plate which extends inwardly of the tube. Alternatively the orifice may be located in the inner baffle 18 adjacent the support plate as shown in dotted in the drawing. The air collection chamber is of substantial volume as compared with known elements in which the air collection chamber is formed using a further tube, within the inner tube.

The action of the baffles 17, 18 and the positioning of the apertures 15 is to lengthen the path along which the fuel must flow between the apertures 15 and the lower end of the tube thereby to allow more time for the sedimentation action to take place.

Although as described the bowl portion is formed integrally with the casing 10, the bowl portion may be formed by a separate housing part which is secured against the lower edge of the casing 10. In this case the two housing parts and the filter element are clamped together using a bolt which extends through the central tube. Moreover, instead of providing the apertures 15 in the form of circular holes as shown, the apertures may have the form of arcuate slots.

I claim:

1. A fuel filter element in combination with a bowl, comprising an outer tube, an inner tube with a bore therethrough situated generally concentrically within said outer tube, said outer and inner tubes defining an annular space having opposite top and bottom ends, top and bottom support plates closing said top and bottom ends respectively of said tubes, a filter medium in said annular space, said top and bottom support plates including fuel flow apertures for allowing fuel to flow into and through said filter medium in said annular space, said bottom support plate having an outer peripheral edge, said apertures in said bottom support plate being situated closely adjacent said outer peripheral edge, said bottom support plate being closable by the bowl situated to engage said bottom support plate radically outward of said apertures therethrough, a first annular baffle extending axially downward from said bottom support plate and situated radially inwardly of the apertures in said bottom support plate, a second annular baffle extending axially downward from said bottom support plate and radially inward of said first annular baffle, said first and second annular baffles and a bottom surface of said bottom support plate between said annular baffles defining an air collection chamber, wherein one of said bottom support plate and said second annular baffle includes an air escape orifice communicating said air collection chamber with the bore of said inner tube.

2. Apparatus according to claim 1 wherein said second annular baffle is situated generally concentrically with said inner tube as an entrance thereto.

3. A fuel filter element according to claim 2 wherein said air escape orifice is situated in said bottom support plate radially outwardly of and closely adjacent said second annular baffle.

4. A fuel filter element according to claim 1 wherein said bottom support plate extends radially inward beyond an end of said inner tube, thus forming a shoulder extending transversely of a longitudinal axis of said inner tube, said air escape orifice being situated in said shoulder.

5. A fuel filter element according to claim 1 wherein said air escape orifice extends transversely through said second annular baffle.

6. A fuel filter element comprising an outer casing having an inner wall, an inner tube which extends within the casing and which has outer and inner walls, first and second support plates which extend between the inner wall of the casing and the outer wall of the inner tube, said support plates being spaced apart in the direction of the longitudinal axis of the inner tube, a filter medium located between said support plates and between the inner wall of the casing and the outer wall of the inner tube, apertures formed in said support plates to allow fuel flow through the filter medium, a longitudinal axis of the inner tube in the use of the filter element being substantially vertically disposed and the fuel flowing downwardly through the apertures formed in the first support plate and then through the filter medium and through the apertures in the second support plate and then upwardly through the inner tube, the apertures in the second support plate being disposed adjacent the outer peripheral edge thereof, first and second tubular baffles carried by the second support plate, said baffles extending in an axial direction on the side of the second support plate remote from the filter medium, the first tubular baffle being positioned radially inwardly of the apertures in the second support plate and the second tubular baffle forming an entrance to an adjacent end of the inner tube, the baffles and the second support plate defining an air collection chamber in which air in the fuel which has passed through the filter medium can collect, and an orifice in one of said second support plate and said second tubular baffle and communicating with said chamber and through which air collecting in said chamber can escape at a controlled rate to an interior of the inner tube.

7. A fuel filter element according to claim 6 in which an inner edge portion of the second support plate overlies the adjacent end of the inner tube and said orifice is formed in said inner edge portion.

8. A fuel filter element according to claim 6, in which said orifice is formed in the second tubular baffle.

* * * * *